United States Patent
Anand et al.

(10) Patent No.: US 9,171,688 B2
(45) Date of Patent: Oct. 27, 2015

(54) COLD FIELD EMISSION CATHODE USING CARBON NANOTUBES

(75) Inventors: Sandeep Venkit Anand, Bangalore (IN); Arvind Krishnaswamy, Bangalore (IN); Debiprosad Roy Mahapatra, Bangalore (IN)

(73) Assignee: Indian Institute of Science (IN)

( * ) Notice: Subject to any disclaimer, the term of this patent is extended or adjusted under 35 U.S.C. 154(b) by 41 days.

(21) Appl. No.: 13/994,015

(22) PCT Filed: Apr. 14, 2011

(86) PCT No.: PCT/IB2011/051618
§ 371 (c)(1),
(2), (4) Date: Jun. 13, 2013

(87) PCT Pub. No.: WO2012/107804
PCT Pub. Date: Aug. 16, 2012

(65) Prior Publication Data
US 2013/0264936 A1    Oct. 10, 2013

(30) Foreign Application Priority Data

Feb. 7, 2011   (IN) .............................. 353/CHE/2011

(51) Int. Cl.
*H01J 1/14*    (2006.01)
*H01J 19/06*   (2006.01)
(Continued)

(52) U.S. Cl.
CPC .................. *H01J 1/304* (2013.01); *H01J 9/025* (2013.01); *B82Y 99/00* (2013.01)

(58) Field of Classification Search
CPC ....... H01J 1/304; H01J 1/3042; H01J 1/3044; H01J 1/3046; H01J 1/3048; H01J 9/025; H01J 9/022; H01J 9/027; B82Y 99/00

USPC .......... 445/50, 51; 313/310, 311, 346 R, 495, 313/496, 497; 977/939
See application file for complete search history.

(56) References Cited

U.S. PATENT DOCUMENTS 5,783,260 A * 7/1998 Kato et al. .................... 427/493
7,264,978 B2   9/2007 Ito
(Continued)

FOREIGN PATENT DOCUMENTS

WO   2002103737 A2   12/2002
WO   2007015710 A2   2/2007
(Continued)

OTHER PUBLICATIONS

Calderon-Colon et al., "A Carbon nanotube field emission cathode with high current density and long-term stability", Nanotechnology, IOP, Bristol, Jul. 2009, pp. 1-5, vol. 20.
(Continued)

*Primary Examiner* — Anh Mai
*Assistant Examiner* — Glenn Zimmerman
(74) *Attorney, Agent, or Firm* — Moritt Hock & Hamroff LLP; Steven S. Rubin, Esq.

(57) ABSTRACT

Devices for use in cold-field emission and methods of forming the device are generally presented. In one example, a method may include providing a conductive base, dispersing carbon-filled acrylic onto the conductive base to form a conductive film, coupling a copper plate to a first side of the conductive film, and irradiating the conductive film. The method may further include dispersing carbon nanotubes (CNTs) on a second side of the conductive film to form a substantially uniform layer of CNTs, removing excess CNTs from the second side, and curing the conductive film. In one example, a device may include a polycarbonate base, a layer of carbon-filled acrylic on one side of the polycarbonate base and a layer of irradiated carbon-filled acrylic on the other, a copper plate coupled to the carbon-filled acrylic, and a substantially uniform layer of randomly aligned CNTs dispersed on the irradiated carbon-filled acrylic.

21 Claims, 17 Drawing Sheets

(51) Int. Cl.
H01K 1/04 (2006.01)
H01J 1/304 (2006.01)
H01J 9/02 (2006.01)
B82Y 99/00 (2011.01)

(56) References Cited

U.S. PATENT DOCUMENTS

| | | | |
|---|---|---|---|
| 7,297,469 | B2 | 11/2007 | Toyota et al. |
| 7,336,023 | B2 | 2/2008 | Youh et al. |
| 7,359,484 | B2 | 4/2008 | Qiu et al. |
| 7,365,481 | B2 | 4/2008 | Kawase et al. |
| 7,462,979 | B2 | 12/2008 | Konishi et al. |
| 7,749,556 | B2 | 7/2010 | Li et al. |
| 7,755,273 | B2 | 7/2010 | Chung et al. |
| 7,780,495 | B2 | 8/2010 | Wei et al. |
| 7,781,950 | B2 | 8/2010 | Liu et al. |
| 7,785,165 | B2 | 8/2010 | Wei et al. |
| 7,785,907 | B2 | 8/2010 | Zheng et al. |
| 7,791,258 | B2 | 9/2010 | Yaniv et al. |
| 7,794,793 | B2 | 9/2010 | Liang |
| 7,799,374 | B2 | 9/2010 | Tung |
| 2004/0104660 | A1* | 6/2004 | Okamoto et al. ......... 313/346 R |
| 2007/0138129 | A1 | 6/2007 | Tung |
| 2010/0196659 | A1* | 8/2010 | Razeeb et al. ................. 428/138 |

FOREIGN PATENT DOCUMENTS

| | | | |
|---|---|---|---|
| WO | WO 2007015710 | A2 * | 2/2007 |
| WO | 2009131754 | A1 | 10/2009 |

OTHER PUBLICATIONS

International Search Report and Written Opinion for PCT application with application No. PCT/IB2011/051618, dated Jul. 20, 2011, 7 pages.
Nair, R. et al., "Enhanced field emission from carbon nanotube conducting polymer composites with low loading", Solid State Communications, (2009), pp. 150-152, 149.
Rinzler, A. G. et al., "Unraveling nanotubes: field emission from an atomic wire", Science 269 (1995), pp. 1550-1553.
De Heer, W. A. et al., "A carbon nano-tube field-emission electron source", Science 270 (1995), pp. 1179-1180.
Chernozatonskii, L. A. et al., "Electron field emission from nanofilament carbon films", Chem. Phys. Lett. 233 (1995), pp. 63-68.
Bonard, J. M. et a., "Field emission from carbon nanotubes: perspectives for applications and clues to the emission mechanism", Appl. Phys. A 69 (1999), pp. 245-254.
Saito, Y. and S. Uemura, "Field emission from carbon nanotubes and its application to electron sources", Carbon 38 (2000), pp. 169-182.
Sugie, H. et al., Carbon nanotubes as electron source in an X-ray tube, Appl. Phys. Lett. (2001), pp. 2578-2580, 78.
Lim, S. C. et al., "Field emission and application of carbon nanotubes", Nano (2007), pp. 69-89, 2 (2).
Schwoebel, P. L. et al., "Field emission arrays for medical X-ray imaging", Appl. Phys. Lett. 88 (2006), 113902-1-3.
Yue, G. Z. et al., "Generation of continuous and pulsed diagnostic imaging X-ray radiation using a carbon-nanotube-based field-emission cathode", Appl. Phys. Lett. (2002), pp. 355-357, 81.
Wang, S. et al., "A novel high resolution micro-radiotherapy system for small animal irradiation for cancer research", Biofactors. (2007), pp. 265-270, 30(4).
Yaghoobi, P. and A. Nojeh, "Electron emission from carbon nanotubes", Modern Phys. Lett. (2007), pp. 1807-1830, 21.
Melnik, R. V. N. and A. Povitsky, "A special issue on modeling coupled and transport phenomena in nanotechnology", J. Comput. Theor. Nanosci. (2006), 2 pages, 3(4).
Melnik, R. et al., "Mathematical and computational models for transport and coupled processes in micro and nanotechnology", J. Nanosci. Nanotechnol. (2008), pp. 3626-3627, 8(7).

Buldum, A. and J.P. Liu, "Electron field emission from carbon nanotubes: modeling and simulations", Mol. Simul. (2004), pp. 199-203, 30.
Sinha, N. et al., "Carbon nanotube thin film field emitting diode: understanding the system response based on multiphysics modeling", J. Comput. Theor. Nanosci. (2007), pp. 1-15, 4.
Sinha, N. et al., "Electro-mechanical interactions in carbon nanotube based thin film field emitting diode", Nanotechnology (2008), p. 1-12, 19.
Roy Mahapatra, D. et al., "Field emission from strained carbon nanotube on cathode substrate", Appl. Surf. Sci. (2008), pp. 1959-1966, 255(5).
Melnik, R. and R. Mahapatra, "Coupled effects in quantum dot nanostructures with nonlinear strain and bridging modelling scales", Comput. Struct. (2007), pp. 698-711, 85(11-14).
Sinha, N. et al., Computational implementation of a new multiphysics model for field emission from CNT thin films, M. Babuk et al., eds., Lecture Notes in Computer Science, ICCS 2008, Part II, LNCS 5102, 2008, pp. 197 206.
Sinha, N. et al., Multi-mode phonon controlled field emission from carbon nanotubes: device modeling and experiments, IEEE Proceedings of 7th International Conference on Nanotechnology, 2007, pp. 961-964.
Wang, M. et al., "Field enhancement array for carbon nanotube array", J. Appl. Phys. (2005), p. 014315-1-4, 98.
G. Chen, et al., "Enhanced field emission properties of vertically aligned double-walled carbon nanotube arrays", Nanotechnology (2008), p. 1-6, 98.
Mahapatra, D. R., et al., "Design optimization of field emission from a stacked carbon nanotube array", NSTI-Nanotech 2008, 2008, pp. 55-58, vol. 1.
Peng, Y., Y. Hu, and H. Wang, "Fabrication of high-resolution multiwall carbon nanotube field emission cathodes at room temperature", J. Vac. Sci. Technol. (2007), pp. 106-108, 25.
Slepyan, G. Y. et al., "Electrodynamics of carbon nanotubes: Dynamic conductivity, impedance boundary conditions, and surface wave propagation", Physical Review B, Dec. 15, 1999, p. 136-149, 60, 24.
Wei, L. and Y.N. Wang, "Electromagnetic wave propagation in single-wall carbon nanotubes", Phys. Lett. A. (2004), pp. 303-309.
Svizhenko, A. et al., "Ballistic transport and electrostatics in metallic carbon nanotubes", IEEE Trans Nanotech. (2005), 7 pages, 4.
Fowler, R. H. and L. Nordheim, "Electron Emission in Intense Electric Fields", Proc. of the Royal Soc. Lond. A (1928), pp. 173-181, 119.
Huang, Z. P., et al., "Field emission of carbon nanotubes", in Encyclopedia of Nanoscience and Nanotechnology, H.S. Nalwa ed., 2004, pp. 401-416, vol. 3.
Mahapatra, D. R., et al., "High resolution surface imaging using a carbon nanotube array with pointed height distribution", NSTI-Nanotech, 2009, pp. 310-313, vol. 1.
Mahapatra, D. R., et al., "Field emission properties of carbon nanotube arrays with defects and impurities", NSTI-Nanotech, 2008, pp. 729-732, vol. 3.
Mahapatra, D. R., et al., "Enhancing field emission from a carbon nanotube array by lateral control of electrodynamic force field", Molecular Simulation, (2009), pp. 512-519, 35 (6).
Hazra, K. S. et al., "Dramatic Enhancement of the Emission Current Density from Carbon Nanotube Based Nanosize Tips with Extremely Low Onset Fields, ACS NANO, 2009, p. 2617-2622, vol. 3-9.
Verma, V. P. et al., Large-area graphene on polymer film for flexible and transparent anode in field emission device, Applied Physics Letter, 2010, 203108-1-3, 96.
Rakhi, R. B. et al., 'Electron field emitters based on multi-walled carbon nanotubes coated with conducting polymer/metal/metal-oxide composites', Journal of Experimental Nanoscience, 2009, 67-76, 4:1.
Minoux, E. et al., Achieving High-Current Carbon Nanotube Emitters, NANO Letters, 2005, 2135-2138, vol. 5:11.

* cited by examiner

COLD FIELD EMISSION CATHODE USING CARBON NANOTUBES

CROSS-REFERENCE TO RELATED APPLICATIONS

The present application is a U.S. National Phase Application pursuant to 35 U.S.C. §371 of International Application no. PCT/IB2011/051618, filed on Apr. 14, 2011, and also claims priority to Indian Patent Application Serial No. 353/CHE/2011 filed on Feb. 7, 2011, the entire contents of which are herein incorporated by reference.

BACKGROUND

Unless otherwise indicated herein, the materials described in this section are not prior art to the claims in this application and are not admitted to be prior art by inclusion in this section.

Carbon nanotubes are used in many applications due to a unique structure that enables strength, flexibility, and unique electrical properties. Carbon nanotubes are allotropes of carbon that have a cylindrical fullerene structure, and may be categorized as single-walled nanotubes (SWNT) or multi-walled nanotubes (MWNT). As the names suggest, SWNTs are cylinders composed of a single wall, while MWNTs include multiple (two or more) concentric cylinders.

A strength and flexibility of carbon nanotubes results from covalent $sp^2$ bonds formed between individual carbon atoms in the carbon nanotube. In one example, carbon nanotubes have been shown to be as much as 100 times stronger than steel. Electrical properties in carbon nanotubes result from a nearly one-dimensional electronic structure, which allows electronic transport to occur ballistically with reduced scattering of electrons. This may allow carbon nanotubes to carry higher currents with reduced heating.

SUMMARY

Devices and methods of fabricating devices for use in cold field emission are generally disclosed. In one example, a device may include a polycarbonate base, a layer of carbon-filled acrylic on a portion of a first side of the polycarbonate base, a layer of irradiated carbon-filled acrylic on a portion of a second side of the base, a copper plate coupled to the layer of carbon-filled acrylic, and a substantially uniform layer of randomly aligned carbon nanotubes dispersed on the layer of irradiated carbon-filled acrylic.

In another example, a method for manufacturing a device for use in cold field emission is described. The method includes providing a conductive base and dispersing carbon-filled acrylic on a portion of the conductive base to form a conductive film. The method also may include coupling a copper plate to a first side of the conductive film, irradiating at least a portion of a second side of the conductive film, and dispersing a plurality carbon nanotubes on a portion of the second side of the conductive film to form a substantially uniform layer of carbon nanotubes. The method may further include removing excess carbon nanotubes from the portion of the second side of the conductive film and curing the conductive film.

In another example, a method for manufacturing a device for use in cold field emission may include providing a polycarbonate base and dispersing a mixture of carbon and acrylic on a portion of a first side and a second side of the polycarbonate base. The method may also include attaching a copper plate to the mixture on the first side of the polycarbonate base, and irradiating the mixture on the second side, thereby dissolving at least a portion of the acrylic in the mixture on the second side. The method may further include dispersing a plurality of randomly aligned carbon nanotubes on the irradiated mixtures to form a substantially uniform layer of CNTs, and curing the polycarbonate base, the mixture of carbon and acrylic, the copper plate, and the CNTs. The carbon in the irradiated mixture may form a portion of a conductive path between the copper plate and the CNTs.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the figures.

DETAILED DESCRIPTION

Figure 1:
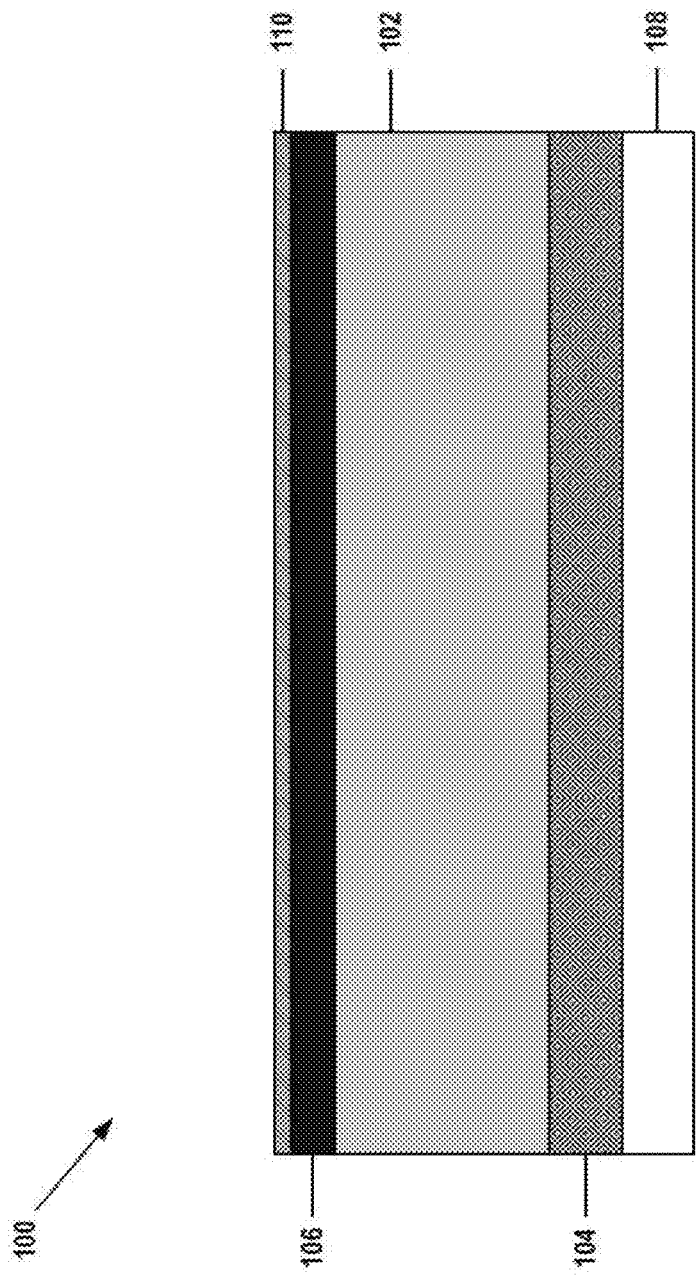
FIG. 1 depicts an example cold field emission cathode.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to devices and methods related to cold field emission cathodes using carbon nanotubes. Briefly stated, in one example, a method may include providing a conductive base, dispersing carbon-filled acrylic onto the conductive base to form a conductive film, coupling a copper plate to a first side of the conductive film, and irradiating the conductive film. The method may further include dispersing carbon nanotubes (CNTs) on a second side of the conductive film to form a substantially uniform layer of CNTs, removing excess CNTs from the second side, and curing the conductive film. In one example, a device may include a polycarbonate base, a layer of carbon-filled acrylic on one side of the polycarbonate base and a layer of irradiated carbon-filled acrylic on the other, a copper plate coupled to the carbon-filled acrylic, and a substantially uniform layer of randomly aligned CNTs dispersed on the irradiated carbon-filled acrylic.

Generally, field emission refers to an induced emission of electrons through application of heat and/or an electric field. When heat is used to induce emission of electrons, the process is referred to as thermal emission, and when an electric field is used to induce emission of electrons, the process is referred to as cold field emission.

In cold field emission, generally, an electric field may be applied to a cathode in a vacuum. When the electric field is applied, electrons located near the Fermi level may escape to the vacuum level and be emitted through a process called Fowler-Nordheim tunneling. In some examples, carbon nanotubes may be deposited in an aligned, non-random manner on cathodes used for cold field emission. While the alignment of the carbon nanotubes may result in desirable properties, the alignment may be difficult to achieve. Cold field emission cathodes that use aligned carbon nanotubes can exhibit high threshold and operating voltages, and may not operate at desired vacuum pressure levels.

In examples described herein, cold field emission cathode devices may be provided with randomly aligned carbon nanotubes. Example devices may exhibit lower threshold and operating voltages as compared to devices with aligned carbon nanotubes, and may be configured to operate at vacuum pressures on the order of about $10^{-3}$ mbar, for example.

FIG. 1 depicts an example cold field emission cathode device 100, arranged in accordance with at least some embodiments of the present disclosure. The cold field emission cathode device 100 may be referred to as a conductive film, for example. The device 100 includes a polycarbonate base 102, a layer of carbon-filled acrylic 104, a layer of irradiated carbon-filled acrylic 106, a copper plate 108, and a layer of randomly aligned carbon nanotubes 110.

The polycarbonate base 102 may be, for example, a polymeric carbon film. The polycarbonate base 102 may be electrically conductive. Alternately or additionally, the polycarbonate base 102 may be flexible. Still alternately or additionally, the polycarbonate base 102 may be lightweight. A thickness of the polycarbonate base 102 may vary depending on a desired application of the device 100. An example thickness of the polycarbonate base 102 may be about 200 μm. Other thicknesses are possible as well.

The copper plate 108 may be, for example, an ultrapure copper plate. In some example, dimensions of the copper plate 108 may be the same as dimensions of the polycarbonate base 102.

The layer of carbon-filled acrylic 104 and the layer of irradiated carbon-filled acrylic 106 are shown dispersed on opposite sides of the polycarbonate base 102. In the layer of carbon-filled acrylic 104, acrylic may be adapted to physically couple the copper plate 108 to the polycarbonate base 102, while carbon may be adapted to electrically couple the copper plate 108 to the polycarbonate base 102. Similarly, in the layer of irradiated carbon-filled acrylic 106, acrylic may be adapted to physically couple the polycarbonate base 102 to the layer of randomly aligned carbon nanotubes 110, while carbon may be adapted to electrically couple the polycarbonate base 102 to the layer of randomly aligned carbon nanotubes 110.

The carbon-filled acrylic may be an off-the-shelf carbon-filled acrylic, or may be prepared in a laboratory by mixing a desired amount of amorphous carbon with an acrylic. In some example, the acrylic may be a methacrylate-based polymer, and the carbon-filled acrylic may be free of solvents.

A thickness of the layer of carbon-filled acrylic 104 and a thickness of the layer of irradiated carbon-filled acrylic 106 may vary depending on a desired application of the device 100. An example thickness of one or both of the layers 104 and 106 may be about 30 μm, or in ranges of about 10 μm to 40 μm, about 20 μm to 60 μm, about 25 μm to 100 μm, or about 50 μm to 200 μm. Other thicknesses are possible as well. In some example, the layer of carbon-filled acrylic 104 and the irradiated layer of carbon-filled acrylic 106 may have the same thickness. In other example, the thicknesses of the layers 104 and 106 may be different. As an example, a thickness of the layer of carbon-filled acrylic 104 may be the same as a thickness of the irradiated layer of carbon-filled acrylic 106 before irradiation, but may be different from a thickness of the irradiated layer of carbon-filled acrylic 106 after irradiation. Other examples are possible as well.

Figures 2A, 2B:
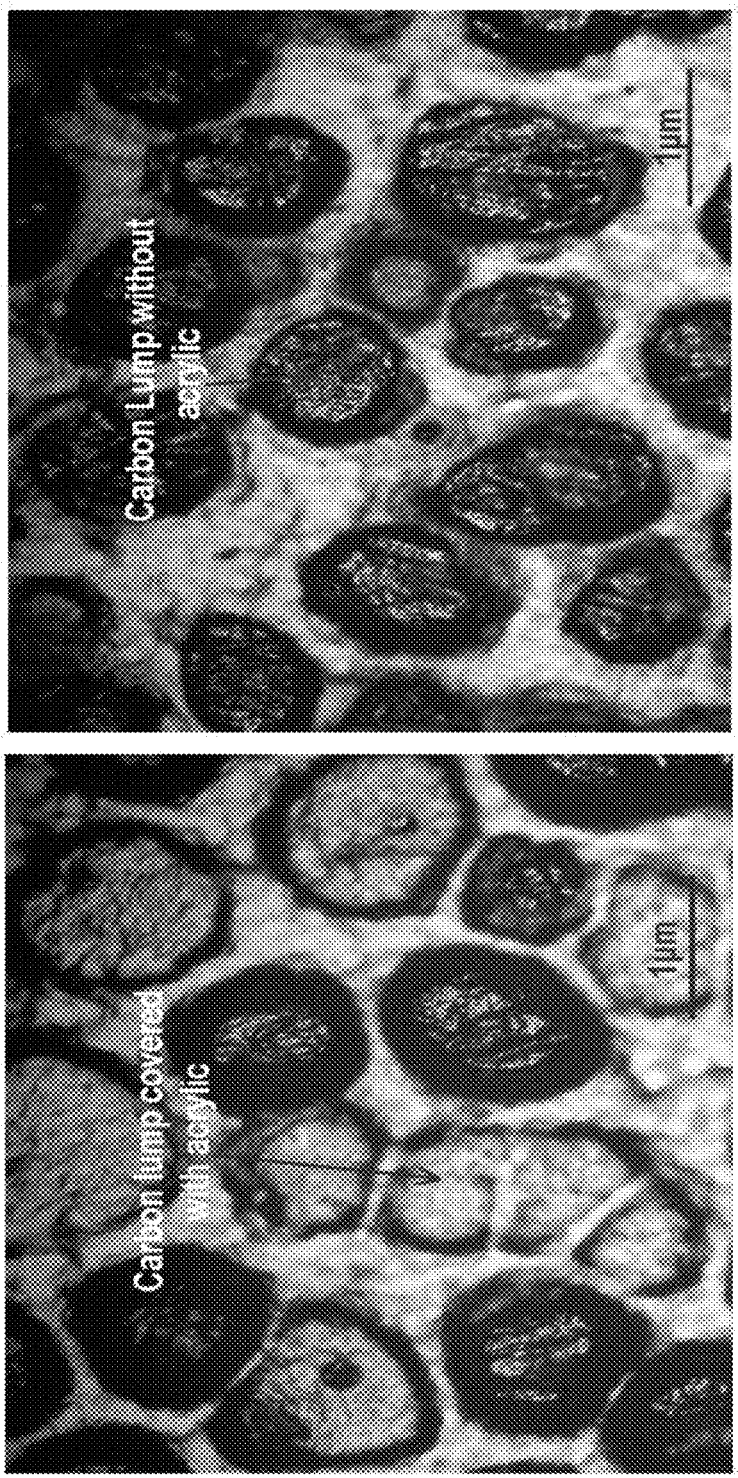
FIGS. 2A-2B depict example optical micrograph images of a layer of carbon-filled acrylic (FIG. 2A) and a layer of irradiated carbon-filled acrylic (FIG. 2B)

FIGS. 2A-2B depict example optical micrograph images of a layer of carbon-filled acrylic (FIG. 2A) and a layer of irradiated carbon-filled acrylic (FIG. 2B), in accordance with at least some embodiments of the present disclosure. As shown in FIG. 2A, each object represents carbon molecules, and the layer of carbon-filled acrylic may include concentrated areas of carbon. In some examples, there may be about $3 \times 10^4$ concentrated areas of amorphous carbon (carbon "lumps") per square centimeter. In other examples, there may be about $1 \times 10^4$ to $4 \times 10^4$, about $2 \times 10^4$ to $6 \times 10^4$, or about $4 \times 10^4$ to $8 \times 10^4$ concentrated areas of amorphous carbon per square centimeter. A higher or lower concentration of carbon is possible as well. In FIG. 2A, some of the concentrated areas of carbon (about 40% to about 50%) are covered with acrylic. Carbon "lumps" covered with acrylic are shown in FIG. 2A lighter in color. As mentioned above, the acrylic may serve to physically couple metal to a polycarbonate base, while the carbon may serve to electrically couple metal to a polycarbonate base.

As shown in FIG. 2B, the layer of irradiated carbon-filled acrylic also includes concentrated areas of carbon, but surfaces of the concentrated areas of carbon are free (or substantially free) of acrylic. This is because irradiation of the layer may cause the carbon to heat up, which in turn may cause acrylic on the surface of concentrated areas of carbon to dissolve, leaving the concentrated areas of carbon exposed. The dissolution of the acrylic may be desirable to improve electrical conductivity of the layer of irradiated carbon-filled acrylic, for example. Specifically, while the acrylic may be useful for physically coupling, the acrylic may also be resistive, which can negatively affect performance of a cold field emission device. By irradiating the layer to remove a portion of the acrylic, conductivity of the layer may be increased, as well as performance of the device, for example.

Returning to FIG. 1, the layer of randomly aligned carbon nanotubes 110 is shown dispersed on the layer of irradiated carbon-filled acrylic 106. Example dimensions of carbon nanotubes in the layer of randomly aligned carbon nanotubes 110 may be about 35 nm to about 40 nm in diameter and greater than about 10 μm in length, or other diameters including about 20 nm to 50 nm, about 50 nm to 100 nm, or about 10-40 nm, and also other lengths including about 5 μm to 20 μm, about 10 μm to 40 μm, or about 3 μm to 5 μm. In some example, the carbon nanotubes may be multi-walled carbon nanotubes, such as multi-walled carbon nanotubes with about 25 to about 40 walls.

In FIG. 1, the layer of carbon-filled acrylic 104 and the layer of irradiated carbon-filled acrylic 106 are shown to be dispersed on opposite sides of the polycarbonate base 102, and to cover an entire area of each side of the polycarbonate base 102. However, in other examples, the layer of carbon-filled acrylic 104 and the layer of irradiated carbon-filled acrylic 106 may be dispersed over a portion of a side of the polycarbonate base 102, or dispersed so as to substantially cover a side of the polycarbonate base 102. Similarly, the layer of randomly aligned carbon nanotubes 110 is shown in FIG. 1 to be dispersed over an entire area of the layer of irradiated carbon-filled acrylic; however, the layer of randomly aligned carbon nanotubes 110 may alternatively be dispersed over a portion of the layer of irradiated carbon-filled acrylic, for example.

During an example operation of the device 100, when a voltage is applied, current may flow through the device 100 from the copper plate 108, through the layer of carbon-filled acrylic 104, the polycarbonate base 102, and the layer of irradiated carbon-filled acrylic 106 to the layer of randomly aligned carbon nanotubes 110. Accordingly, conductivity of the carbon nanotubes may affect performance of the device 100. The conductivity of the carbon nanotubes may depend to some extent on their energy band gap. In general, carbon nanotubes with a smaller energy band gap may be better conductors than carbon nanotubes with larger energy band gaps, for example.

Figure 3:
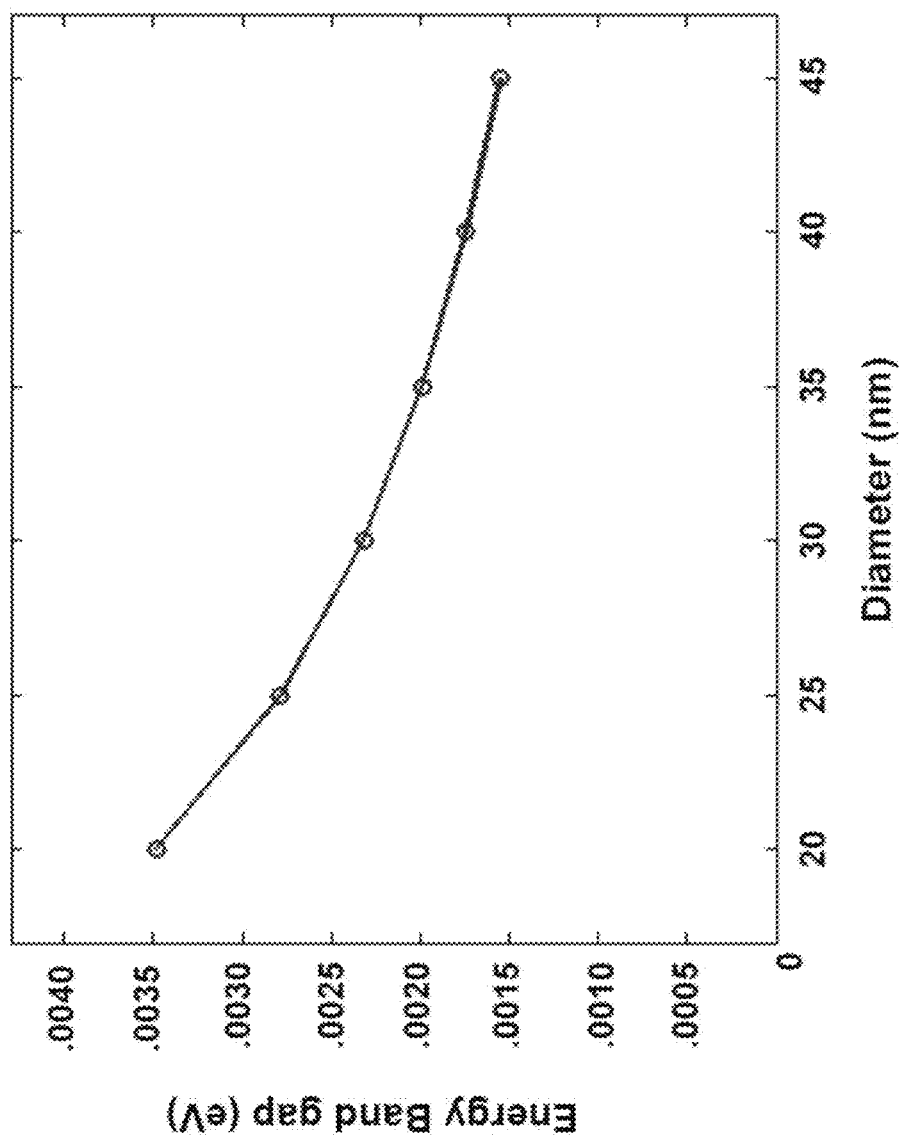
FIG. 3 depicts a graph showing an example relationship between a diameter of a multi-walled carbon nanotube and its energy band gap.

FIG. 3 depicts a graph showing an example relationship between a diameter of a multi-walled carbon nanotube and its energy band gap, in accordance with at least some embodiments of the present disclosure. As shown, multi-walled carbon nanotubes with wider diameters may exhibit smaller energy band gaps. An energy band gap of multi-walled carbon nanotubes may vary from about 0 eV to about 2 eV. In some examples, the energy band gap of the carbon nanotubes in the layer of randomly aligned carbon nanotubes 110 in FIG. 1 may range from about 0.17 meV to about 0.27 meV. Other energy band gaps are possible as well.

The energy band gap of a carbon nanotube is generally governed by an applied voltage according to the Schrödinger equation:

$$(H_o + eV)\Psi = E\Psi \quad (1)$$

where $H_o$ is a Hamiltonian operator, e is the charge of an electron, V is the applied voltage, $\Psi$ is the wave function, and E is an energy state. The difference between the lowest E for a conduction electron energy state (also called the bottom of the conduction band) and the highest E for a valence electron energy state (also called the top of the valence band) gives the energy band gap.

In a carbon nanotube, the average number of electrons, in a particular energy state, $E_i$, may be estimated using the Dirac distribution:

$$f(E_i) = \frac{1}{e^{(E_i - \mu)/kT} + 1} \quad (2)$$

where $E_i$ is the particular energy state, $\mu$ is the Fermi level of the carbon nanotube, k is the Boltzmann constant, and T is the absolute temperature.

The current in the carbon nanotubes is generally proportional to $\Psi^2 f(E_i)$. As the Dirac distribution $f(E_i)$ is a function of the energy state, E, which is in turn a function of the applied voltage, V, the current in the carbon nanotubes is generally also governed by the applied voltage, V.

Figure 4:
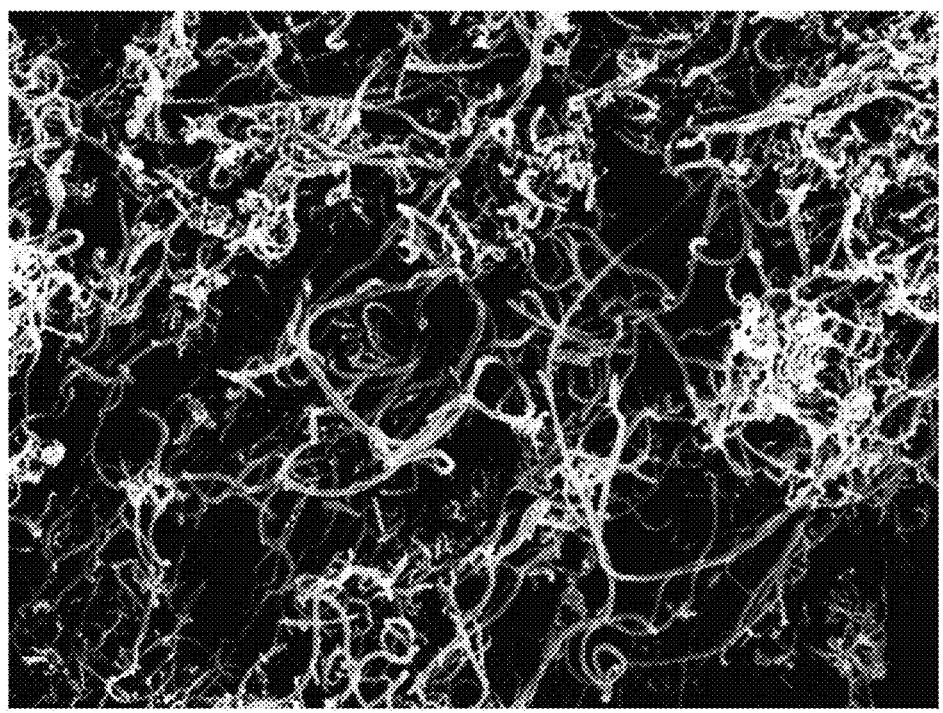
FIG. 4 depicts an example scanning electron microscope image of one configuration of randomly aligned carbon nanotubes.

FIG. 4 depicts an example scanning electron microscope image of one configuration of randomly aligned carbon nanotubes, in accordance with at least some embodiments of the present disclosure. The carbon nanotubes are shown as long cylinders of varying configurations. As shown, the carbon nanotubes are randomly aligned with one another, and in some cases are on top of one another, for example. Carbon nanotubes lighter in color are those closer to the surface, while darker carbon nanotubes are situated below the lighter carbon nanotubes.

Figure 5:
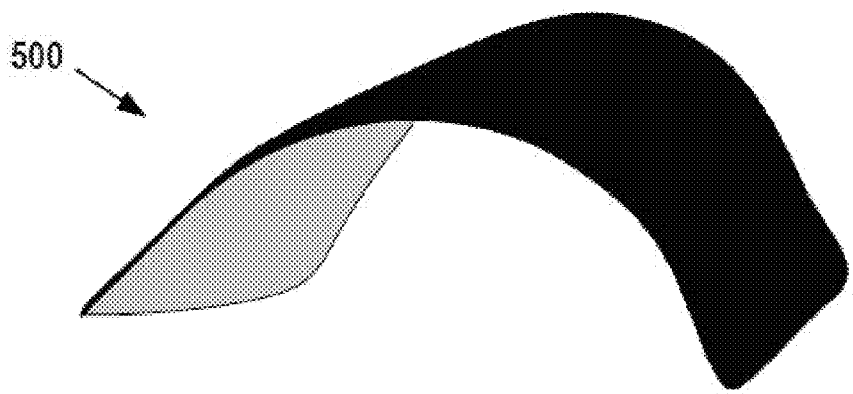
FIG. 5 depicts an example cold field emission cathode device.

FIG. 5 depicts an example cold field emission cathode device 500, arranged in accordance with at least some embodiments of the present disclosure. The cold field emission cathode device 500 is shown bent to illustrate flexibility of the device, for example. The cold field emission cathode device 500 may have a configuration similar to that shown and described in FIG. 1. For example, a darker top side of the cold field emission cathode device 500 includes a layer of carbon nanotubes, while a lighter colored underside of the cold field emission cathode device 500 includes a copper plate. Remaining layers of the cold field emission cathode device 500 are between the carbon nanotubes and copper plate, and are not shown in FIG. 5.

Figure 6:
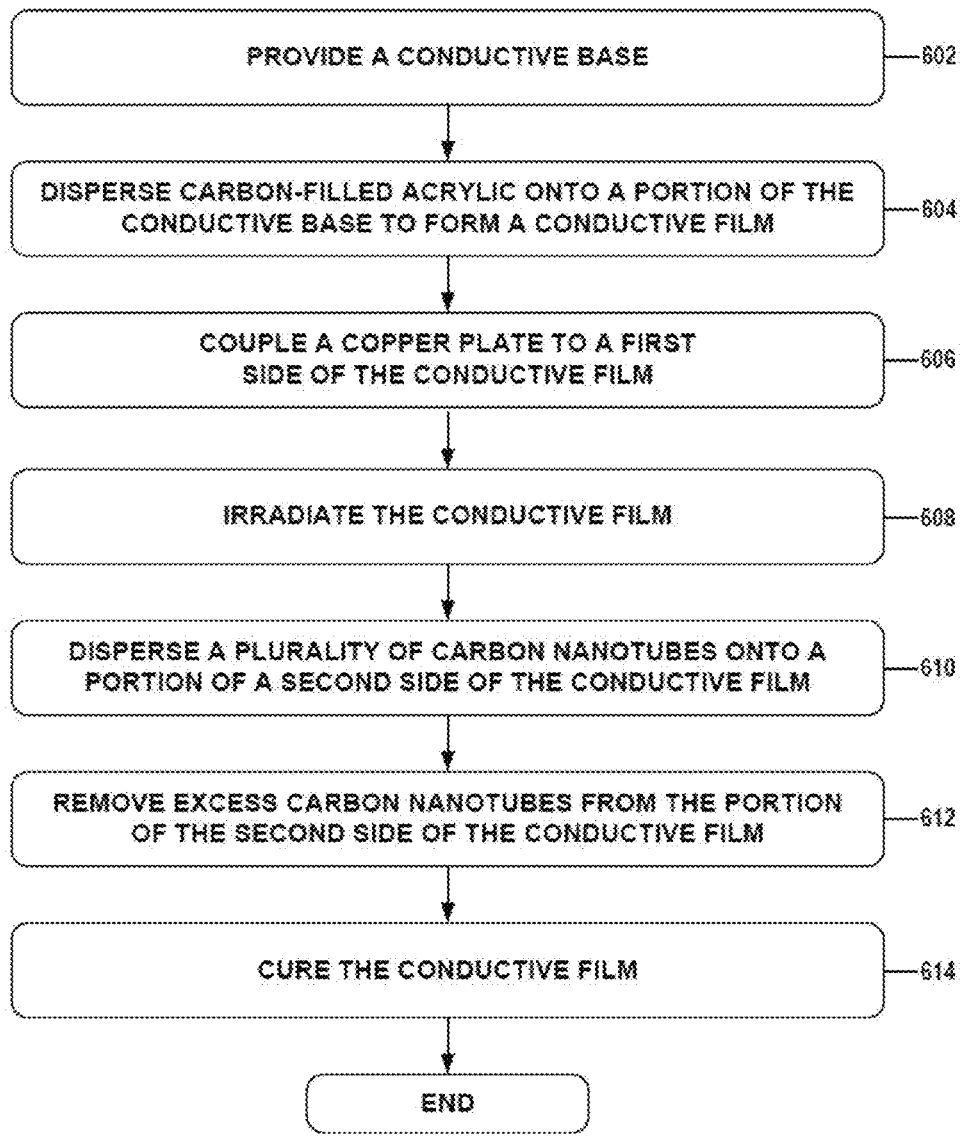
FIG. 6 is a flow chart depicting an example method for fabricating a conductive film.

FIG. 6 is a flow chart depicting an example method for fabricating a conductive film, and FIGS. 7A-7H illustrate an example method for fabricating a conductive film; in accordance with at least some embodiments of the present disclosure. FIGS. 6 and 7A-7H will be described together. The conductive film of FIGS. 6 and 7A-7H may be used as, for example, a cold field emission cathode.

The method in FIG. 6 may include one or more operations, functions, or actions as illustrated by one or more of blocks 602, 604, 606, 608, 610, 612, and/or 614. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

As shown, the method may begin at block 602, "PROVIDE A CONDUCTIVE BASE". For example, in FIG. 7A, a conductive base 702 is shown. In some examples, the conductive base 702 may be a polycarbonate or other flexible base. Other conductive bases are possible as well. The conductive base may be provided to a dispersing apparatus.

Block 602 may be followed by block 604. At block 604, the method includes "DISPERSE CARBON-FILLED ACRYLIC ONTO A PORTION OF THE CONDUCTIVE BASE TO FORM A CONDUCTIVE FILM". For example, in FIG. 7B, a first layer of carbon-filled acrylic 704a may be dispersed using a dispersing apparatus 708 on a first side of the conductive base 702, and a second layer of carbon-filled acrylic 704b may be dispersed on a second side of the conductive base 702. The first and second layer of carbon-filled acrylic 704a and 704b may be formed from the same carbon-filled acrylic, or may be formed from different carbon-filled acrylics, such as acrylics having different concentrations of carbon. Other examples are possible as well. The conductive base 702 together with the first and second layers of carbon-filled acrylic 704a and 704b may form a conductive film 706.

Dispersing the carbon-filled acrylic 704a and/or 704b onto the conductive base 702 may be performed in several ways. As an example, a dispersing apparatus 708, such as a dispersion mill, may be used to disperse the carbon-filled acrylic 704a and/or 704b onto the conductive base 702. Alternately or additionally, a template or mask including one or more slits may be positioned over the conductive base 702, and the carbon-filled acrylic 704a and/or 704b may be dispersed onto the conductive base 702 through the slit in the template. In some embodiments, the template and the conductive base 702 may be moved relative to one another while the carbon-filled acrylic 704a and/or 704b is dispersed. Still alternately or additionally, the carbon-filled acrylic 704a and/or 704b may be dispersed onto the conductive base 702 using, for example, a syringe, and a spin coating or electro-spinning machine may be used to achieve a substantially uniform distribution of the carbon-filled acrylic 704a and/or 704b on the conductive base 702. Still alternately or additionally, the carbon-filled acrylic 704a and/or 704b may be injected through a precision mold onto the conductive base 702. Still alternately or additionally, vapor-phase carbon-filled acrylic 704a and/or 704b may be deposited on the conductive base 702 using a chemical vapor deposition process. Other dispersion techniques are possible as well.

Block 604 may be followed by block 606. At block 606, the method includes "COUPLE A COPPER PLATE TO A FIRST SIDE OF THE CONDUCTIVE FILM". For example, in FIG. 7C, a copper plate 708 can be coupled to the first layer of carbon-filled acrylic 704a formed on a first side 710 of the conductive base 702. In some embodiments, a mechanical gripper or clamp 713 may be used to couple the copper plate 708 to the conductive film 706. Acrylic in the first layer of carbon-filled acrylic 704a may be adapted to physically couple the copper plate 708 to the conductive base 702, while carbon in the first layer of carbon-filled acrylic 704a may be adapted to electrically couple the copper plate 708 to the conductive base 702.

In some examples, before the copper plate 708 can be coupled to the first side 710 of the conductive film 706, one or both of the copper plate 708 and the conductive film 706 may be cut to specific dimensions, depending on a desired application of the conductive film 706. In some examples, the copper plate 708 and the conductive film 706 may be cut to the same dimensions.

Figure 7A:
FIGS. 7A-7H illustrate an example method for fabricating a conductive film.
Figure 7B:
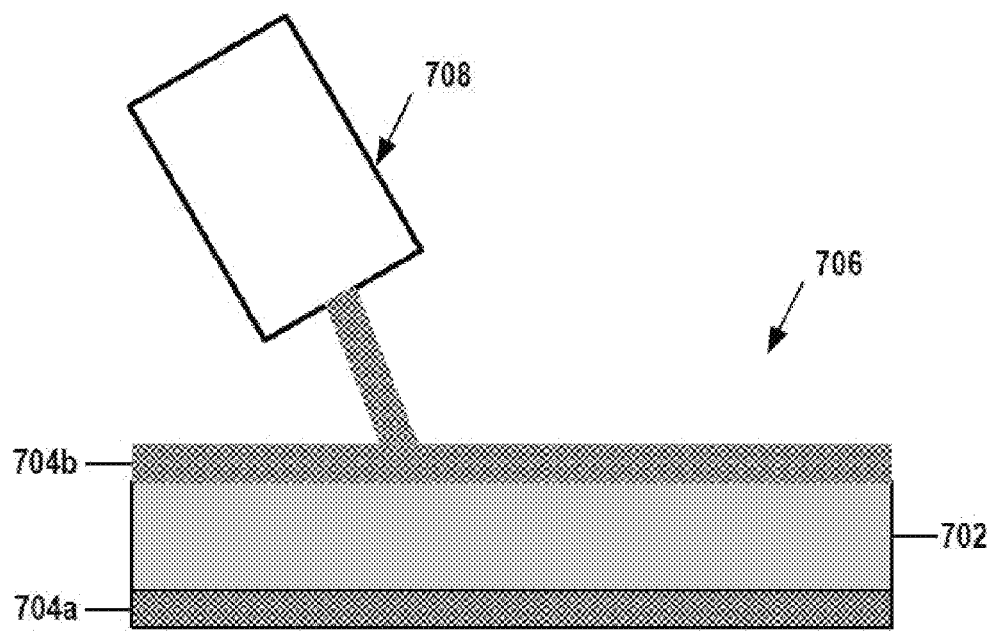
Figure 7C:
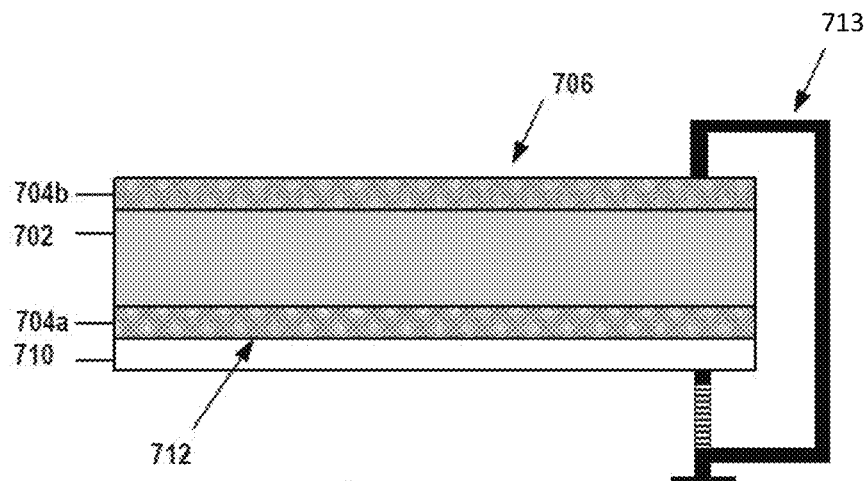
Figure 7D:
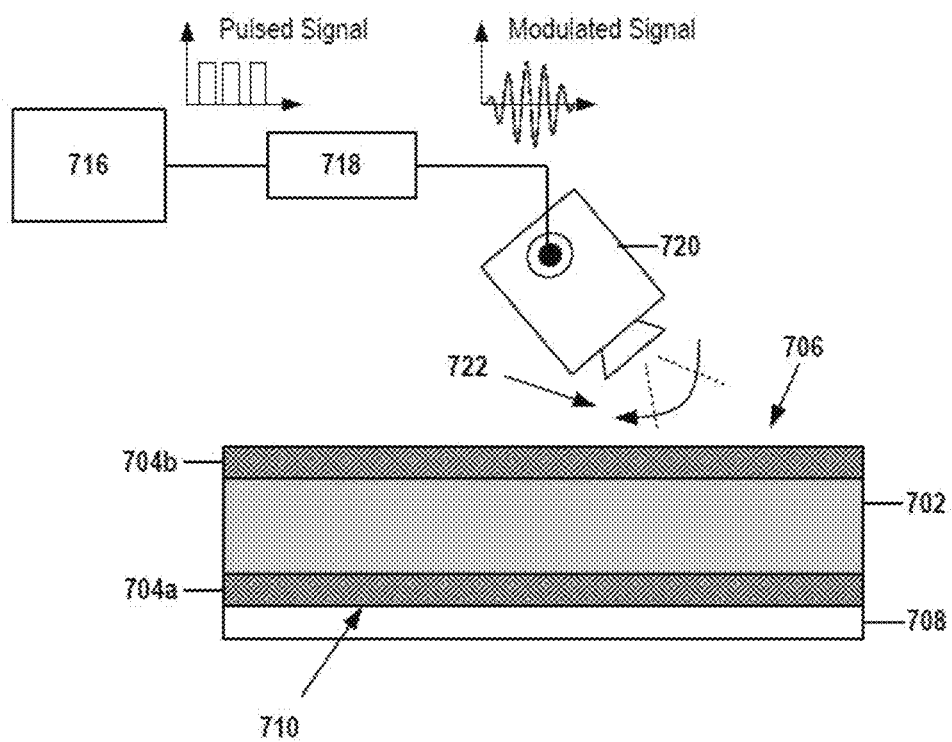
Figure 7E:
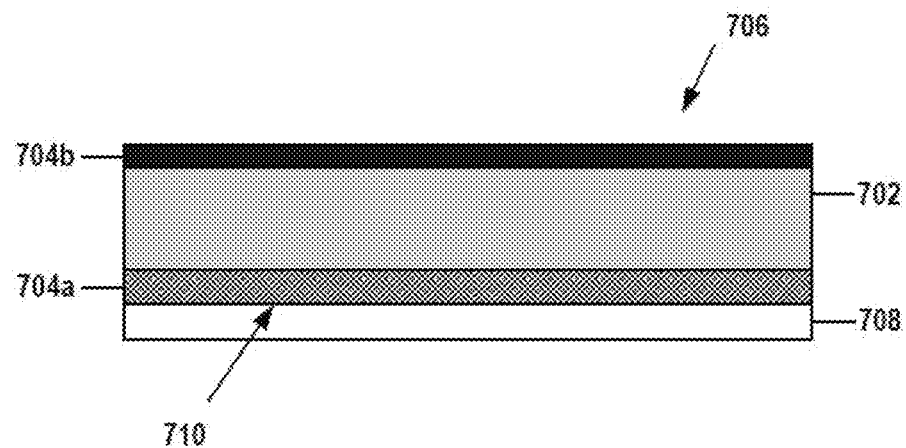

Block 606 may be followed by block 608. At block 608, the method includes "IRRADIATE THE CONDUCTIVE FILM". In some examples, block 608 may include irradiating the conductive film 706 with an infrared laser continuously (or substantially continuously) for a predetermined period of time. For example, the infrared laser may be an 802 nm laser and may be used at a power level of about 0.5 W. As another example, the predetermined period of time may be about 5 minutes. Other examples are possible as well. As shown in FIG. 7D, irradiating the conductive film 706 may involve irradiating the second layer of carbon-filled acrylic 704b using infrared light 722 from an infrared laser 720. The infrared laser 720 may be controlled by a computer 716 and a controller 718. The computer 716 may be adapted to provide a pulsed signal to the controller 718, and the controller 718 may be adapted to receive the pulsed signal as an input and produce a modulated signal as an output. The modulated signal may be output by the controller 718 to the infrared laser 720. The infrared laser 720 may receive the modulated signal as an input and produce the infrared light 722 as an output. As shown, the infrared laser 720 may be adapted to move relative to the surface of the conductive film 706 so as to irradiate the second layer of carbon-filled acrylic 704b. As a result of being irradiated, carbon in the second layer of carbon-filled acrylic 704b heats up, which may cause acrylic on the surface of the carbon to dissolve, as shown in FIG. 7E where the second layer of carbon-filled acrylic 704b includes no or little amounts of acrylic, for example. The dissolution of the acrylic may serve to increase electrical conductivity of the second layer of carbon-filled acrylic 704b, and thus, may improve performance of the conductive film 706. In particular, larger emission currents may be produced at lower voltages, as compared to typical conductive films. As an example, at a voltage of 1 kV, typical conductive films have been shown to produce emission currents of about 15 µA, while conductive films fabricated according to the methods described herein have been shown to produce emission currents on the order of 16 mA at the same voltage.

In addition to dissolving a portion of the acrylic in the second layer of carbon-filled acrylic 704b, the irradiation may also act as a stabilization process for the conductive film 706 to slow a rate of decay during later use of the conductive film 706.

Figure 7F:
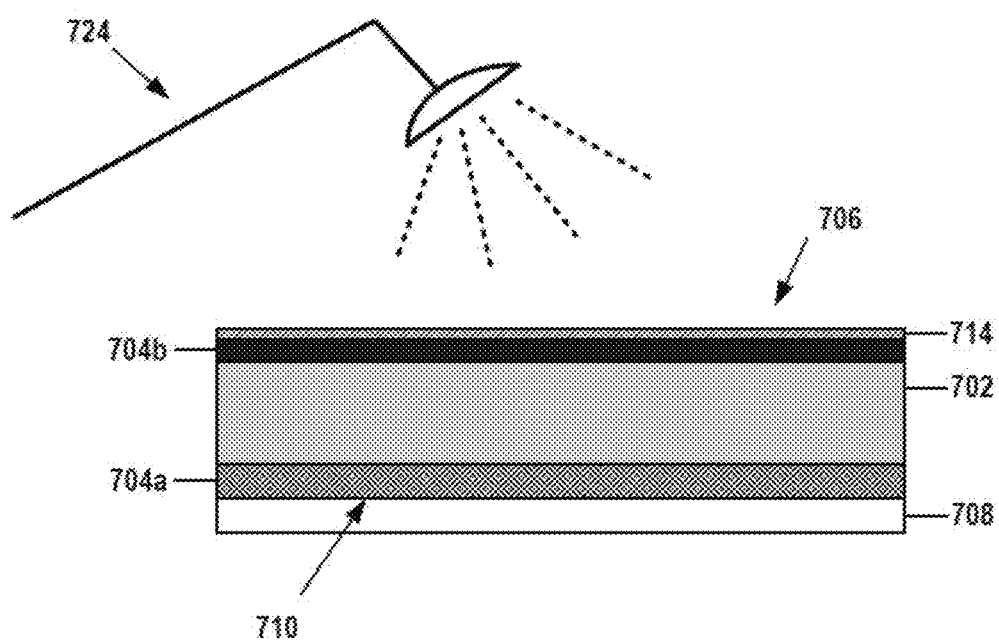

Block 608 may be followed by block 610. At block 610, the method includes "DISPERSE A PLURALITY OF CARBON NANOTUBES ONTO A PORTION OF A SECOND SIDE OF THE CONDUCTIVE FILM". In some examples, the carbon nanotubes may be in the form of a powder and may form a substantially uniform dispersion on the second side of the conductive film. Mass and other measurements may be used to measure and ensure a uniform (or substantially uniform) dispersion of the carbon nanotubes. As shown in FIG. 7F, carbon nanotubes 714 may be dispersed on the second layer of carbon-filled acrylic 704b using, for example, a spraying apparatus 724. Alternately or additionally, the carbon nanotubes 714 may be dispersed using a shaker of some kind. Other means of dispersing the carbon nanotubes 714 are possible as well. A concentration of the dispersed carbon nanotubes 714 may be, for example, around 0.0015 g/cm$^2$ to about 0.0006 g/cm$^2$. Other concentrations are possible as well.

In some examples, dispersing the carbon nanotubes 714 may be performed using a sprinkler mounted on a stand using clamps. The carbon nanotubes 714 may be sprinkled from the sprinkler at a substantially constant rate and the conductive film 706 may be moved relative to the sprinkler to obtain a substantially uniform dispersion of the carbon nanotubes 714. In other examples, dispersing the carbon nanotubes 714 may be performed using a spraying system for carbon nanotubes 714 in a powder or liquid form (such as carbon nanotubes mixed with an evaporable solvent). Other types of dispersion are possible as well.

Figure 7G:
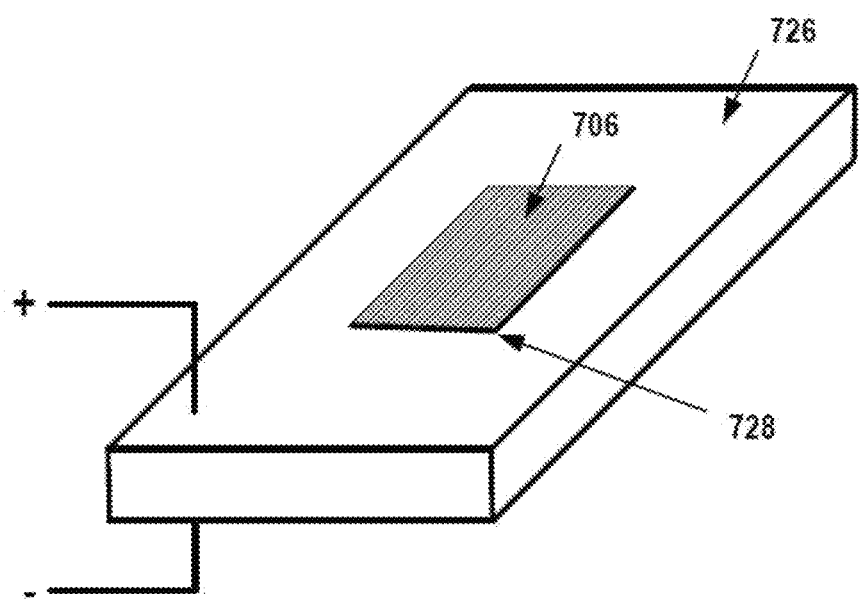

Block 610 may be followed by block 612. At block 612, the method includes "REMOVE EXCESS CARBON NANOTUBES FROM THE PORTION OF THE SECOND SIDE OF THE CONDUCTIVE FILM". In some examples, it may be desirable to remove excess carbon nanotubes from a surface of the conductive film. The excess carbon nanotubes may be carbon nanotubes that are loosely bonded to the conductive film so that the carbon nanotubes may be removed by, for example, tapping or vibrating the conductive film. FIG. 7G shows the conductive film 706 positioned on a piezoelectric actuator bed 726. In some embodiments, an insulating material 728 may be placed between the conductive film 706 and the piezoelectric actuator bed 726. An alternating current may be applied across the piezoelectric actuator bed 726, causing the piezoelectric actuator bed 726 to vibrate, thereby loosening the excess carbon nanotubes. Alternately or additionally, an ultrasonic bath may be used to remove the excess carbon nanotubes. Other examples are possible as well.

Figure 7H:
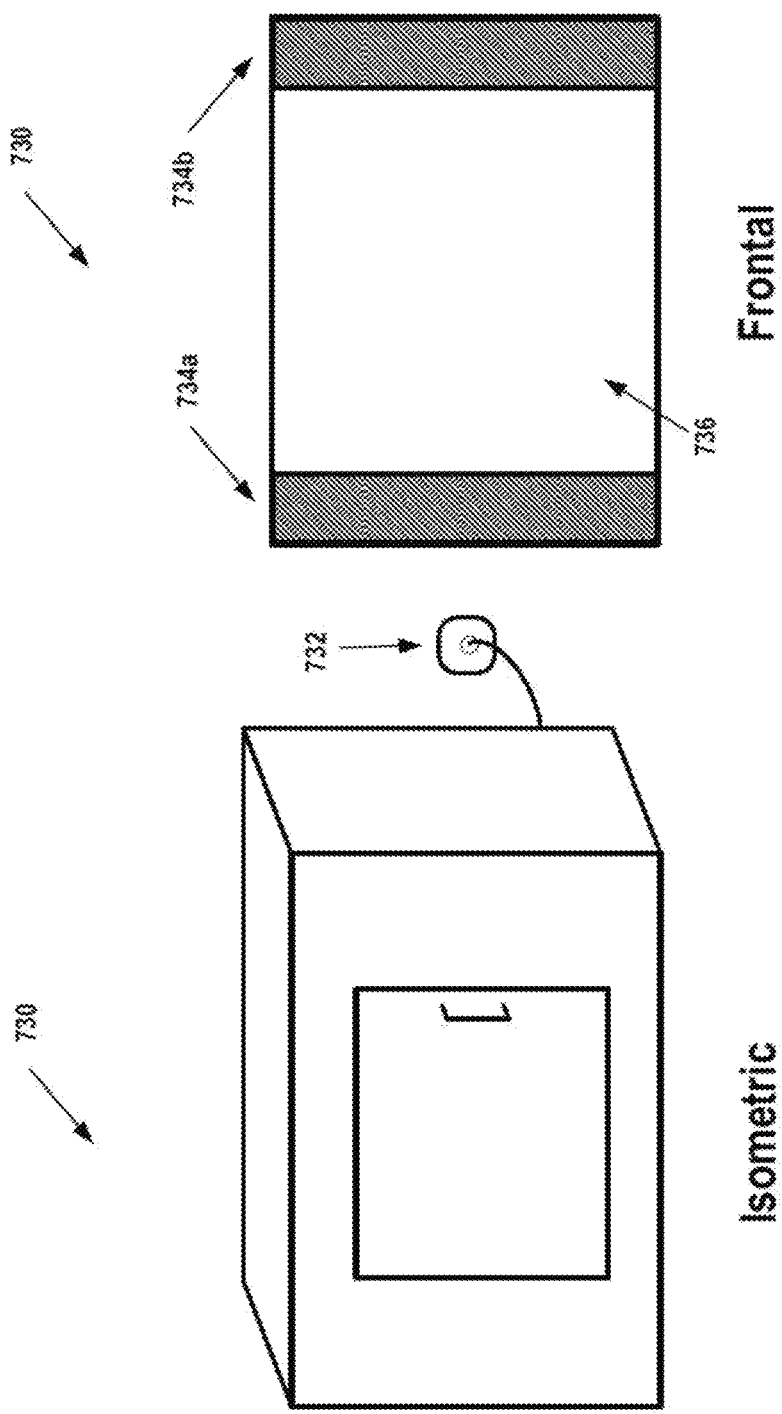

Block 612 may be followed by block 614. At block 614, the method includes "CURE THE CONDUCTIVE FILM". In some examples, the conductive film may be cured in a thermal chamber. FIG. 7H shows a three-dimensional isometric (left) and two-dimensional front (right) view of a thermal chamber 730. The thermal chamber 730 may be powered by a power source 732. In some embodiments, the thermal chamber 730 may operate by means of one or more heating coils, such as heating coils 734a and 734b surrounding the interior of the thermal chamber 730. Other types of thermal chambers are possible as well. Inside the thermal chamber 730, the conductive film 706 may be cured at a temperature of, for example, about 120° C. for a predetermined period of time, such as about 24 hours. Other examples are possible as well. Curing may contribute to completion of polymerization of the conductive film. In particular, once the conductive film is heated above a certain temperature, called the glass transition temperature, moisture and other gases previously absorbed by the dispersed carbon nanotubes may be removed, which improves the conductivity of the conductive film. Additionally, curing the conductive film may lead to improved compressive residual stress, thereby improving the mechanical performance of the conductive film for certain applications, such as in flexible electronics.

Figure 8:
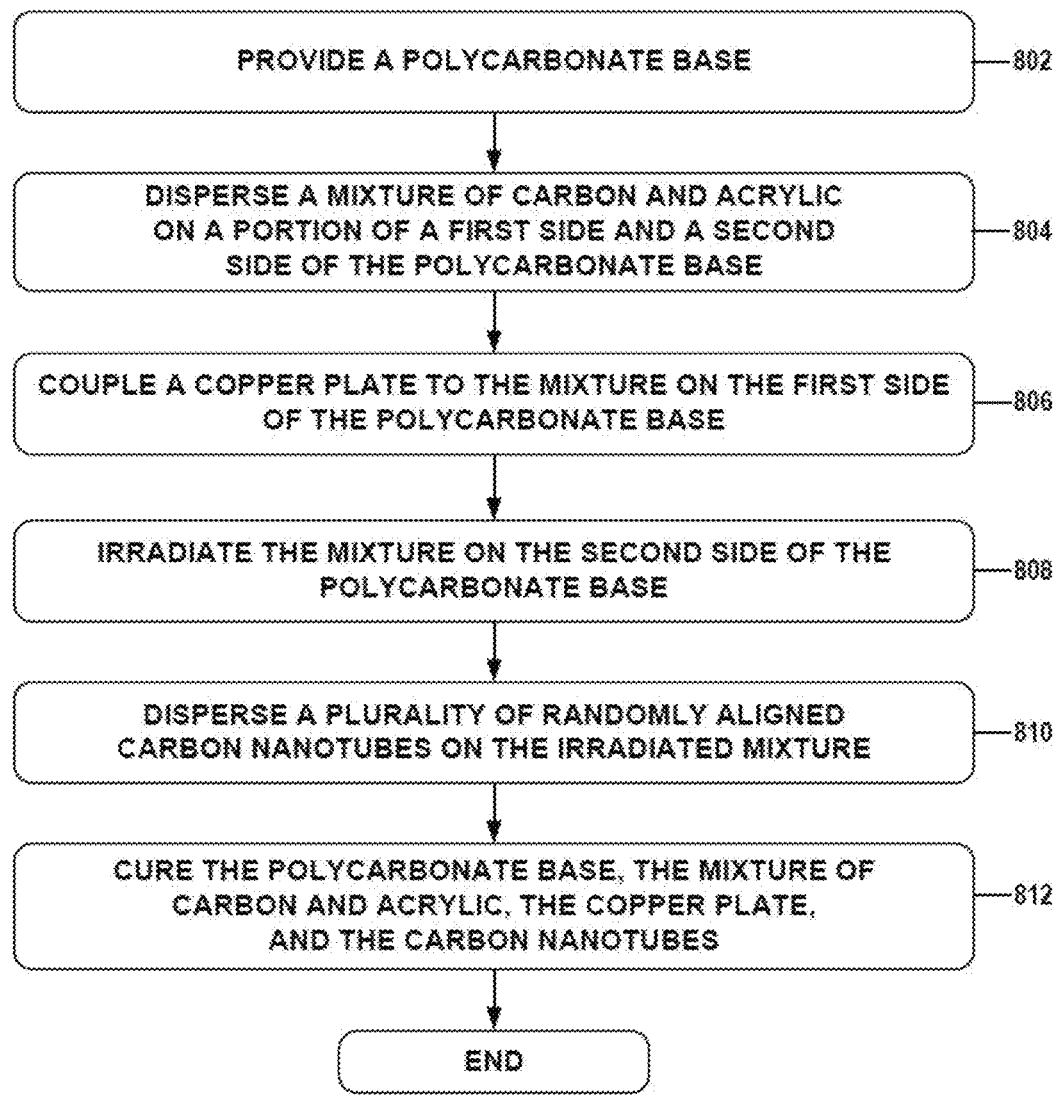
FIG. 8 is a flow chart depicting an example method for fabricating a cold field emission cathode.

FIG. 8 is a flow chart depicting an example method for fabricating a cold field emission cathode, arranged in accordance with at least some embodiments of the present disclosure. The method in FIG. 8 may include one or more operations, functions, or actions as illustrated by one or more of blocks 802, 804, 806, 808, 810, 812, and/or 814. Although the blocks are illustrated in a sequential order, these blocks may also be performed in parallel, and/or in a different order than those described herein. Also, the various blocks may be combined into fewer blocks, divided into additional blocks, and/ or eliminated based upon the desired implementation.

As shown, the method begins at block 802, "PROVIDE A POLYCARBONATE BASE". Block 802 may be followed by block 804. At block 804, the method includes "DISPERSE A MIXTURE OF CARBON AND ACRYLIC ON A PORTION OF A FIRST SIDE AND A SECOND SIDE OF THE POLYCARBONATE BASE". In some examples, the mixture of carbon and acrylic may be a carbon-filled acrylic. Other examples are possible as well. The mixture of carbon and acrylic may be dispersed using, for example, a dispersing apparatus, such as the dispersing apparatus described above in connection with FIG. 7B.

Block 804 may be followed by block 806. At block 806, the method includes "COUPLE A COPPER PLATE OT THE MIXTURE ON THE FIRST SIDE OF THE POLYCARBONATE BASE". The copper plate may be coupled to the mixture using, for example, a mechanical gripper or clamp, such as the mechanical gripper described above in connection with FIG. 7C. The acrylic in the mixture may serve to physically couple the copper plate to the polycarbonate base, while the carbon in the mixture may serve to electrically couple the copper plate to the polycarbonate base.

Block 806 may be followed by block 808. At block 808, the method includes "IRRADIATE THE MIXTURE ON THE SECOND SIDE OF THE POLYCARBONATE BASE". The mixture may be irradiated using, for example, an infrared laser, such as the infrared laser described above in connection with FIG. 7D. The irradiation may cause the carbon in the mixture to heat up, thus causing the acrylic in the mixture to be dissolved. In this manner, the irradiation may serve to improve the electrical conductivity of the mixture on the second side.

Block 808 may be followed by block 810. At block 810, the method includes "DISPERSE A PLURALITY OF RANDOMLY ALIGNED CARBON NANOTUBES ON THE IRRADIATED MIXTURE". The randomly aligned carbon nanotubes may be dispersed using, for example, a spraying apparatus, such as the spraying apparatus described above in connection with FIG. 7F.

Block 810 may be followed by block 812. At block 812, the method includes "CURE THE POLYCARBONATE BASE". The curing process may be performed in a thermal chamber, such as the thermal chamber described above in connection with FIG. 7H.

Figure 9:
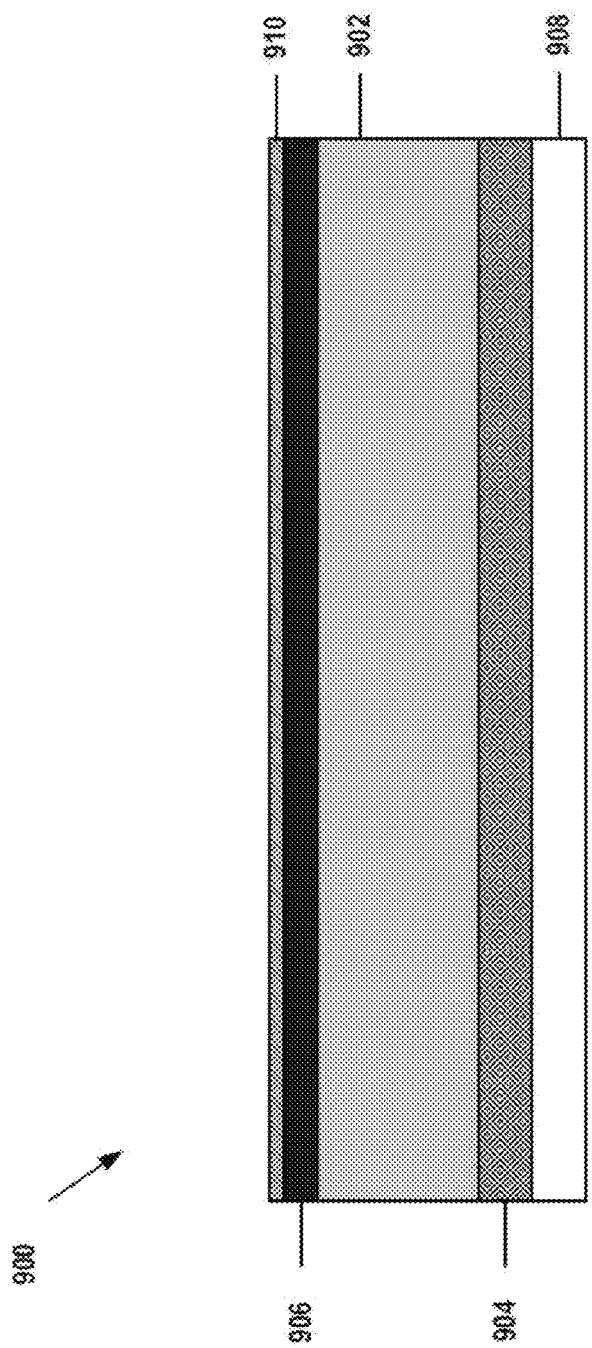
FIG. 9 illustrates an example cold field emission cathode.

FIG. 9 illustrates an example cold field emission cathode, arranged in accordance with at least some embodiments of the present disclosure. In FIG. 9, a cold field emission cathode 900 is illustrated including a polycarbonate base 902, a layer of a mixture of carbon and acrylic 904, a layer of an irradiated mixture of carbon and acrylic 906, a copper plate 908, and a layer of randomly aligned carbon nanotubes 910.

A conductive path may be formed through the cold field emission cathode 900 from the copper plate 908 through the layer of the mixture of carbon and acrylic 904, the polycarbonate base 902, the layer of the irradiated mixture of carbon and acrylic 906, and the randomly aligned carbon nanotubes 910. As described above, the irradiated mixture of carbon and acrylic 906 may have improved electrical conductivity as a result of the irradiation. Additionally, random alignment of the carbon nanotubes in the layer of randomly aligned carbon nanotubes 910 may similarly result in improved conductivity of the carbon nanotubes in the cold field emission cathode 900, as compared to typical cold field emission cathodes. As an example, typical cold field emission cathodes have been shown to have conductivity on the order of 1.87 $(\Omega cm)^{-1}$, while cold field emission cathodes fabricated according to the methods disclosed herein have been shown to have a conductivity on the order of 2.66 $(\Omega cm)^{-1}$ for cold field emission cathodes with a concentration of carbon nanotubes around 4.5 $mg/cm^2$ and on the order of 3.33 $(\Omega cm)^{-1}$ for cold field emission cathodes with a concentration of carbon nanotubes around 6 $mg/cm^2$. Thus, cold field emission cathodes fabricated according to the methods disclosed herein show a 40-80% increase in conductivity as compared to typical cold field emission cathodes. The random alignment of the carbon nanotubes in the devices disclosed herein may allow for multiple conductive paths through the carbon nanotubes leading to higher currents, for example.

The combination of the irradiated mixture of carbon and acrylic 906 and the randomly aligned carbon nanotubes 910 may result in a reduction in the work function (e.g., energy needed to move an electron from the Fermi level into vacuum) at an interface of the carbon nanotubes and a vacuum. A reduction in the work function at the interface may result in a reduction in power consumption by the cold field emission cathode 900 and may allow the cold field emission cathode 900 to operate at pressures on the order of about $10^{-3}$ mbar. Additionally, a reduction in the work function at the interface may result in a reduction in a density of carbon nanotubes required for a desired level of emission by the cold field emission cathode 900. An improvement in power consumption, vacuum pressure, and the density of carbon nanotubes may lead to an increase in a field enhancement factor, $\beta$, of the cold field emission cathode 900, for example.

Figure 10A:
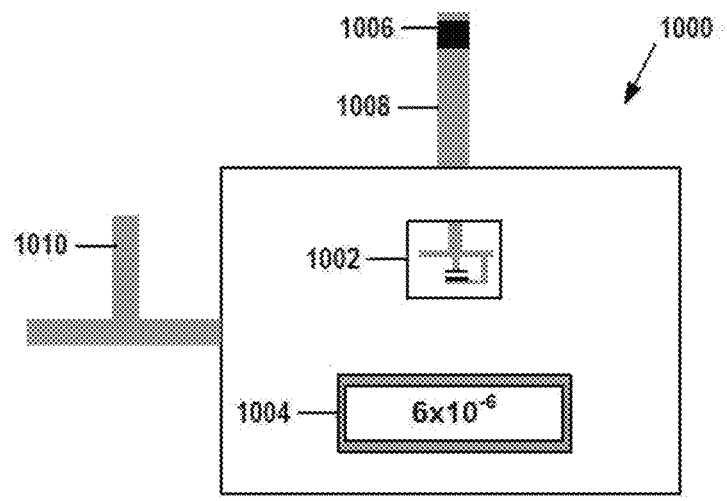
FIGS. 10A-10C depict an example experimental setup for measuring electrical properties of a cold field emission cathode.
Figure 10B:
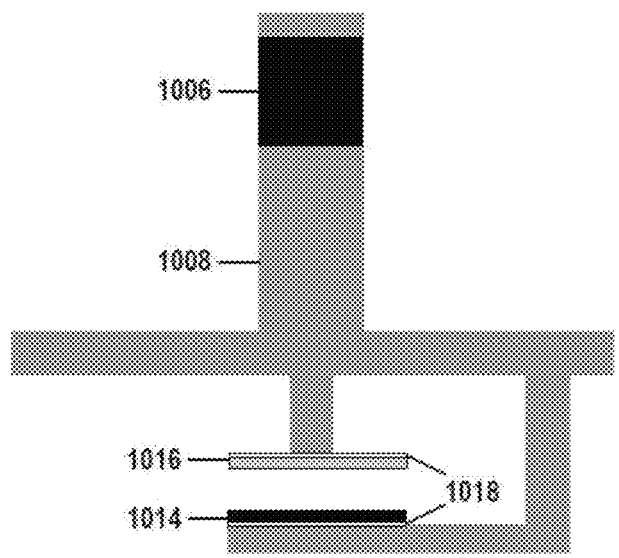
Figure 10C:
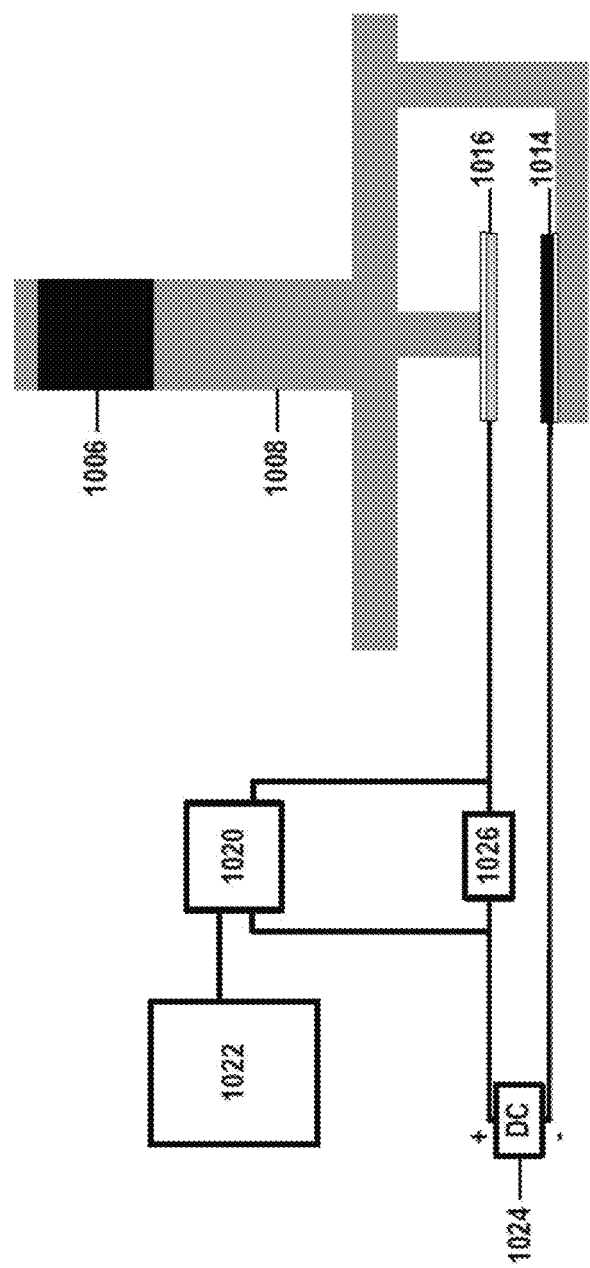

FIGS. 10A-10C depict an example experimental setup for measuring electrical properties of a cold field emission cathode, arranged in accordance with at least some embodiments of the present disclosure. In FIG. 10A, the experimental setup includes a vacuum chamber 1000 in which a cold field emission cathode is placed in proximity to an ultrapure copper anode (shown in FIG. 10B). The vacuum chamber 1000 may include a view port 1002 through which the cold field emission cathode may be seen during measurements, as well as a vacuum pressure display 1004 on which a pressure inside the vacuum chamber 1000 can be displayed. The pressure is shown to be $6 \times 10^{-6}$ bar (or $6 \times 10^{-3}$ mbar), which is the pressure at which the experiment may begin. The above described devices and methods allow for improvement in the vacuum pressures required for operation as compared to devices fabricated according to other methods. In particular, while some devices may require operation to be carried out at in a range from about $10^{-6}$ mbar to about $10^{-7}$ mbar, the devices described herein have been shown to operate at pressures on the order of about $10^{-3}$ mbar.

The vacuum chamber 1000 is shown to also include a micrometer 1006 connected to a central shaft 1008. The vacuum chamber 1000 is shown to additionally include port 1010 for electrical connections to which a set of shielded cables may be attached. The electrical connections may vary depending on the objectives of the experiment.

FIG. 10B illustrates a cold field cathode 1014 and an ultrapure copper anode 1016 (e.g., as may be viewed through the view port 1002) each positioned on an insulation layer 1018 and held at a fixed distance from one another. In an example experiment, the cold field cathode 1014 and the ultrapure copper anode 1016 may be maintained at a distance of about 0.5 mm from one another. As shown, the ultrapure copper anode 1016 is affixed to the central shaft 1008 such that a distance can be maintained using the micrometer 1006.

In some embodiments, to further slow the rate of decay during later use of the cold field cathode 1014, a pre-emission burn may be performed. FIG. 10C illustrates the cold field cathode 1014 and the ultrapure copper anode 1016 in a vacuum chamber, such as the vacuum chamber 1000 shown in FIG. 10A. The cold field cathode 1014 and the ultrapure copper anode 1016 may be connected to a data acquisition unit 1020 which in turn may be connected to a computer 1022. During the pre-emission burn, a direct current supply 1024 may be connected to the cold field cathode 1014 and the ultrapure copper anode 1016, as shown. The direct current supply 1024 and a resistor 1026 may be selected and controlled to apply a sufficiently high voltage across the cold field cathode 1014 and the ultrapure copper anode 1016 to produce a series of spikes in the emission current, followed by a stable emission current. The applied voltage may cause the tips of the carbon nanotubes as well as defect areas in the cold field cathode 1014 to breakdown, thus allowing the carbon nanotubes to attain a more stable morphological arrangement. By performing a pre-emission burn, future breakdown of the carbon nanotubes may be reduced, thereby slowing the rate of decay during later use of the cold field cathode 1014.

Example experiments were performed using the experimental setup described in FIGS. 10A-10B to measure electrical properties of various fabricated cold field emission cathodes. FIGS. 11A-11D depict graphs comparing example electrical properties of various fabricated cold field emission cathodes.

Figure 11A:
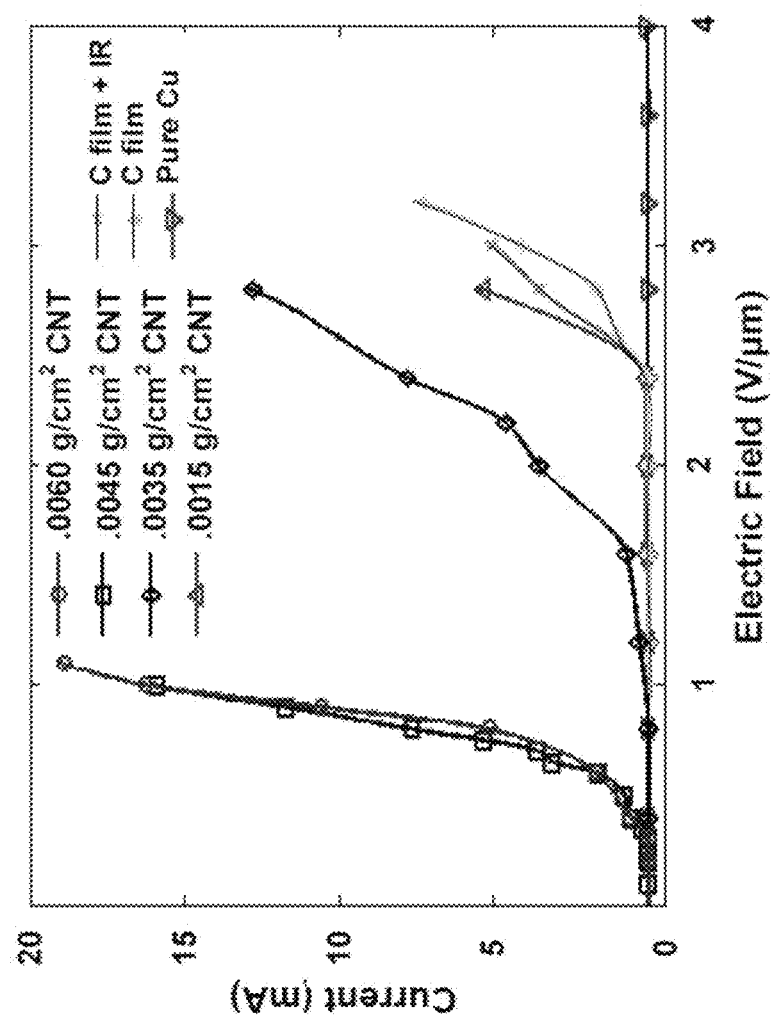
FIGS. 11A-11D depict graphs comparing example electrical properties of various fabricated cold field emission cathodes, all arranged in accordance with at least some embodiments of the present disclosure.

FIG. 11A shows field emission current as a function of an applied electric field for several cold field emission cathodes fabricated with various concentrations of carbon nanotubes, in accordance with at least some embodiments of the present disclosure. As shown, higher concentrations of carbon nanotubes resulted in higher currents for the same electric field. Additionally, higher concentrations of carbon nanotubes allowed for lower threshold voltages. Devices fabricated according to the methods described herein exhibited threshold voltages in the range of about $0.2 V/\mu m$ to about $0.3 V/\mu m$. Further, with the application of a $1 V/\mu m$ electric field, the devices exhibited currents in the range of about 10 mA to about 20 mA.

Figure 11B:
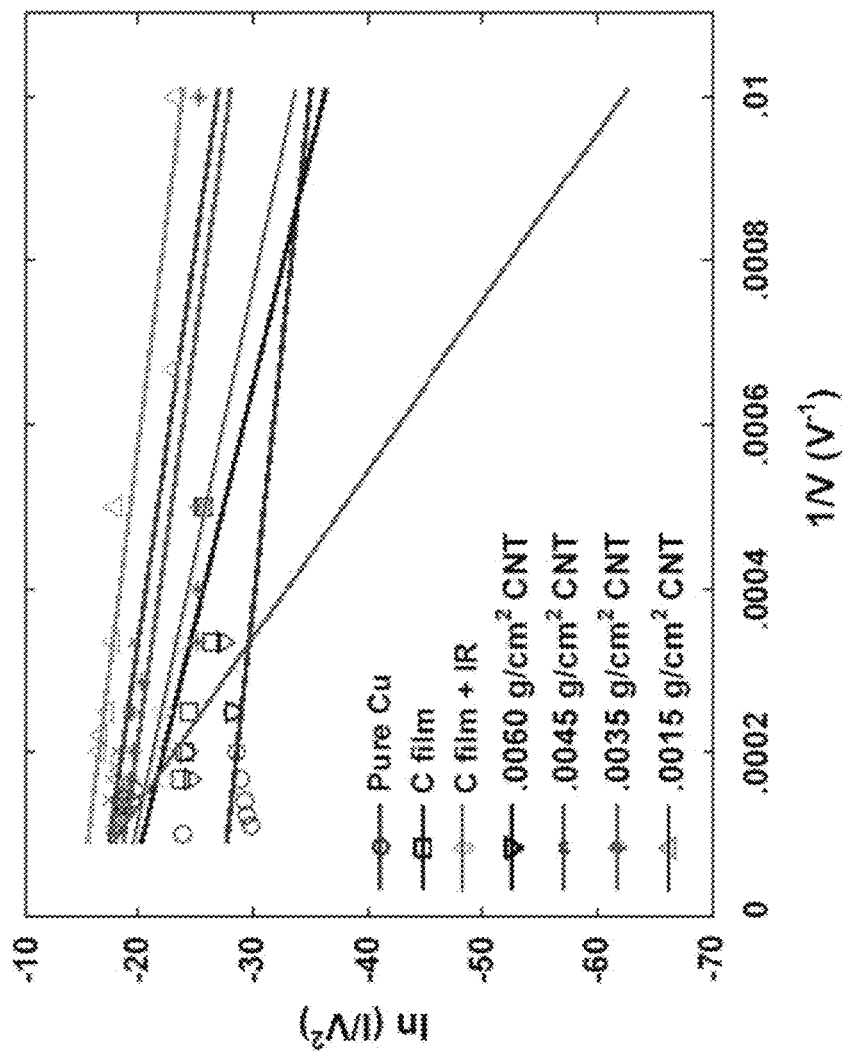

FIG. 11B is a Fowler-Nordheim plot used in field emission applications to calculate a field enhancement factor, $\beta$, of a device. The Fowler-Nordheim plot is based on the Fowler-Nordheim mechanism, in which field emission current, I, is related to applied electric field V through the following equation:

$$I = \frac{AK}{\varphi}\left[\frac{V}{d}\right]^2 \beta^2 \exp\left(\frac{B\varphi^{1.5}d}{\beta V}\right) \quad (3)$$

where A and d are dimensions of the cold field emission cathode, K and B are empirical fitting constants, and $\varphi$ is the work function of the carbon nanotubes in the cold field emission cathode. The field enhancement factor, $\beta$, may be determined empirically from a plot of the Fowler-Nordheim equation. For example, the equation may be rearranged to show a relationship between an inverse of the electric field, $$\frac{1}{V},$$

and a natural log of an inverse square of the field, ln $$\frac{1}{V^2},$$

such that a slope of the resulting graph is proportional to $$\frac{1}{\beta}.$$

As shown, higher concentrations of carbon nanotubes resulted in higher values of $\beta$. Devices fabricated according to the methods described herein exhibited $\beta$ values in the range of about 13,000 to about 41,000.

Figure 11C:
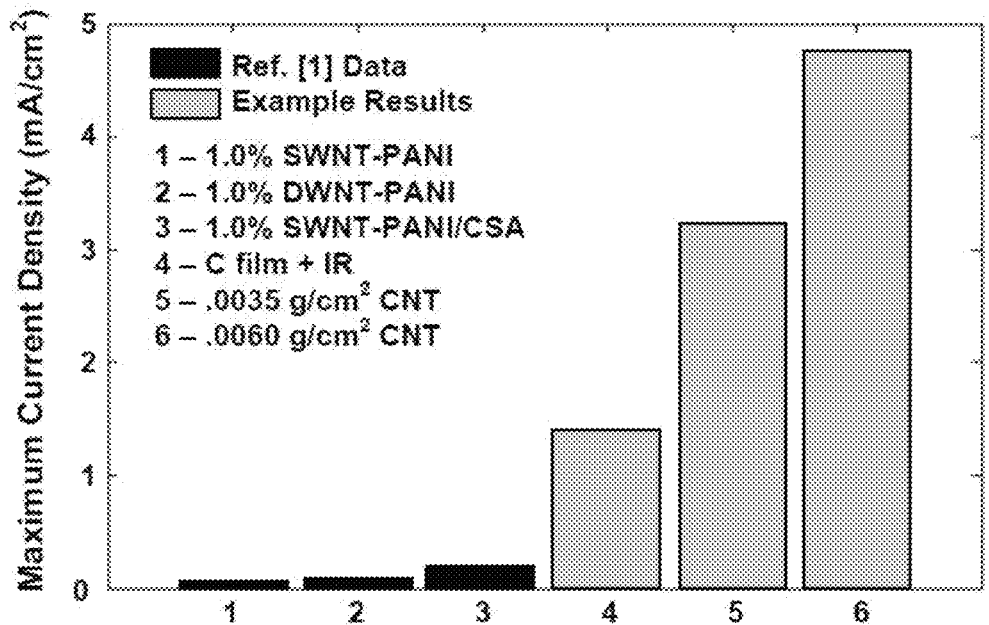
Figure 11D:
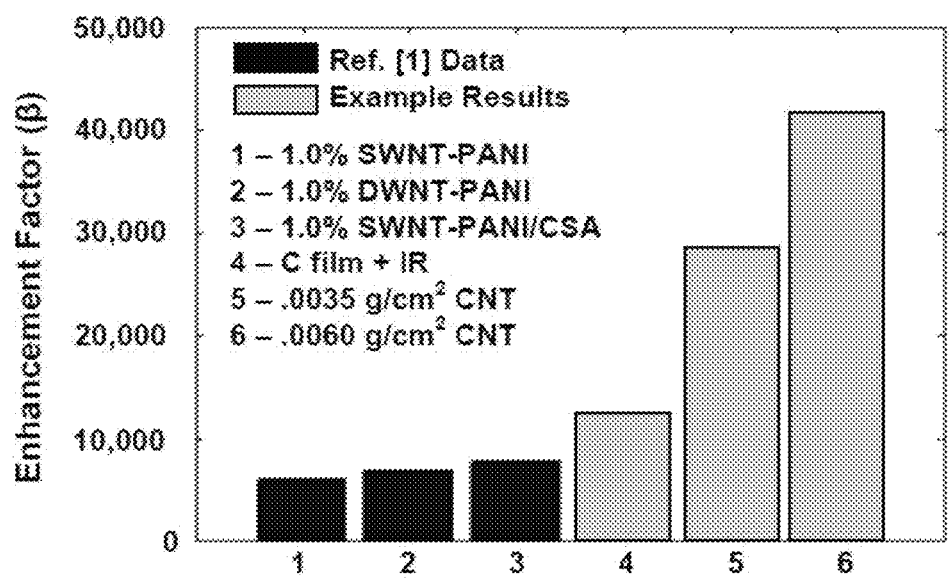

FIGS. 11C and 11D are plots that compare example maximum current density and enhancement factors (respectively) of devices according to the methods described herein with maximum current density and enhancement factors of devices fabricated according to other methods. As shown, values for maximum current density and enhancement factors of devices fabricated according to at least some of the methods described herein were higher than those of devices fabricated according to other methods.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or figures, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of forming a cold field emission cathode, comprising:
    providing a conductive base;
    dispersing carbon-filled acrylic onto a portion of a first side and a portion of a second side of the conductive base to form a first side and a second side of a conductive film;
    coupling a copper plate to the first side of the conductive film;
    irradiating at least a portion of the second side of the conductive film;
    dispersing a plurality of carbon nanotubes (CNTs) onto a portion of the second side of the conductive film to form a substantially uniform layer of CNTs;
    removing excess CNTs from the portion of the second side of the conductive film; and
    curing the conductive film.

2. The method of claim 1, wherein the conductive base comprises a polymeric carbon film.

3. The method of claim 1, wherein the copper plate comprises an ultrapure copper plate.

4. The method of claim 1, wherein irradiating the second side of the conductive film comprises irradiating the second side of the conductive film with infrared light.

5. The method of claim 1, wherein irradiating the second side of the conductive film comprises removing at least a portion of the carbon-filled acrylic.

6. The method of claim 1, wherein the substantially uniform layer of CNTs has a surface density that is between about 0.0015 grams per $cm^2$ to about 0.006 grams per $cm^2$.

7. The method of claim 1, wherein the CNTs are multi-walled CNTs (MWCNTs).

8. The method as in claim 7, wherein the MWCNTs each comprise between about 25 to about 40 walls.

9. The method of claim 1, wherein the CNTs have a diameter that is between about 25 nm to about 40 nm.

10. The method of claim 1, wherein the CNTs have a length that is greater than or equal to about 10 µm.

11. The method of claim 1, wherein the CNTs are randomly aligned with respect to one another.

12. The method of claim 1, wherein removing the excess CNTs comprises loosening the excess CNTs.

13. The method of claim 1, wherein curing the conductive film comprises curing the conductive film at a temperature of about 120° C.

14. The method of claim 1, further comprising forming at least one electrode comprising the conductive film.

15. A device, comprising:
- a polycarbonate base;
- a layer of carbon-filled acrylic on a portion of a first side of the polycarbonate base;
- a layer of irradiated carbon-filled acrylic on a portion of a second side of the polycarbonate base;
- a copper plate coupled to the layer of carbon-filled acrylic on the portion of the first side of the polycarbonate base; and
- a substantially uniform layer of randomly aligned carbon nanotubes (CNTs) dispersed on the layer of irradiated carbon-filled acrylic.

16. The device of claim 15, wherein the CNTs are multi-walled CNTs (MWCNTs).

17. The device of claim 15, wherein carbon in the irradiated carbon-filled acrylic forms a portion of a conductive path between the copper plate and the CNTs.

18. The device of claim 15, wherein the device is a cold field emission cathode.

19. The device of claim 16, wherein the MWCNTs each comprise between about 25 to about 40 walls.

20. A method of forming a cold field emission cathode, comprising:
- providing a polycarbonate base;
- dispersing a mixture of carbon and acrylic on a portion of a first side and a portion of a second side of the polycarbonate base;
- coupling a copper plate to the mixture on the first side of the polycarbonate base;
- irradiating the mixture on the second side of the polycarbonate base, thereby dissolving at least a portion of the acrylic in the mixture on the second side of the polycarbonate base;
- dispersing a plurality of randomly aligned carbon nanotubes (CNTs) on the irradiated mixture to form a substantially uniform layer of CNTs; and
- curing the polycarbonate base, the mixture of carbon and acrylic, the copper plate, and the CNTs, wherein carbon in the irradiated mixture forms a portion of a conductive path between the copper plate and the CNTs.

21. The method of claim 20, wherein the CNTs are multi-walled CNTs.

* * * * *